US012603759B2

(12) United States Patent (10) Patent No.: US 12,603,759 B2
Wilson (45) Date of Patent: Apr. 14, 2026

(54) DISTRIBUTION AND UPDATE OF KEYS

(71) Applicant: NVIDIA CORPORATION, Santa Clara, CA (US)

(72) Inventor: Scott Wilson, Golden, CO (US)

(73) Assignee: Nvidia Corporation, Santa Clara, CA (US)

( * ) Notice: Subject to any disclaimer, the term of this patent is extended or adjusted under 35 U.S.C. 154(b) by 53 days.

(21) Appl. No.: 18/266,477

(22) PCT Filed: Dec. 10, 2021

(86) PCT No.: PCT/US2021/062876
§ 371 (c)(1),
(2) Date: Jun. 9, 2023

(87) PCT Pub. No.: WO2022/125943
PCT Pub. Date: Jun. 16, 2022

(65) Prior Publication Data
US 2024/0056290 A1 Feb. 15, 2024

Related U.S. Application Data

(60) Provisional application No. 63/124,668, filed on Dec. 11, 2020.

(51) Int. Cl.
*H04L 9/08* (2006.01)
*H04L 9/14* (2006.01)
(52) U.S. Cl.
CPC .............. *H04L 9/0816* (2013.01); *H04L 9/14* (2013.01)

(58) Field of Classification Search
CPC ....... H04L 9/0816; H04L 9/14; H04L 9/0822; H04L 9/0897; H04L 9/0891; G06F 21/602; G06F 21/6218
See application file for complete search history.

(56) References Cited

U.S. PATENT DOCUMENTS

| | | | | |
|---|---|---|---|---|
| 5,825,879 A * | 10/1998 | Davis | ................. | H04N 21/4405 |
| | | | | 713/192 |
| 6,704,871 B1 | 3/2004 | Kaplan et al. | | |
| 8,116,455 B1 * | 2/2012 | Sussland | ............... | H04L 9/3234 |
| | | | | 380/278 |
| 11,194,922 B2 * | 12/2021 | Parida | ................. | G06F 21/6227 |
| 11,888,975 B2 * | 1/2024 | Black | ................... | H04L 9/0822 |
| 2002/0106079 A1 * | 8/2002 | Mauro | ................... | H04L 9/088 |
| | | | | 380/29 |

(Continued)

FOREIGN PATENT DOCUMENTS

| | | |
|---|---|---|
| WO | 1999014881 A2 | 3/1999 |
| WO | 2006083007 A2 | 8/2006 |

*Primary Examiner* — Abiy Getachew
(74) *Attorney, Agent, or Firm* — Hogan Lovells US LLP

(57) ABSTRACT

Cluster storage systems (100) and methods provide secure generation, distribution, and update of encryption keys (132, 142) during initial cluster formation and cluster membership changes without using readable persistent media. A cryptographic coprocessor (130) stores a key encryption key (132) in write-only memory and uses the unreadable key (132) for encryption and decryption of a data encryption key (142). Methods to securely distribute the initial or updated key (132) to be stored in the coprocessor (130) and securely update the key (132) when cluster membership changes are provided.

20 Claims, 4 Drawing Sheets

(56)  References Cited

U.S. PATENT DOCUMENTS

2008/0240421 A1 *  10/2008  Gopal ................ G06F 9/30007
                                                      380/28
2010/0208889 A1 *   8/2010  Humphrey ........... H04L 9/0894
                                                      380/278
2014/0237261 A1 *   8/2014  Diep .................. G06F 12/1408
                                                      713/189

* cited by examiner

200 ⟍

300 ⟍

600

THE SPU READS THE ENCRYPTED DATA ENCRYPTION KEY FROM PERSISTENT STORAGE TO THE CRYPTOGRAPHIC COPROCESSOR

610

THE CRYPTOGRAPHIC COPROCESSOR DECRYPTS THE ENCRYPTED DATA ENCRYPTION KEY TO EXTRACT THE DISK ENCRYPTION KEY

620

STORE THE DATA ENCRYPTION KEY ONLY IN VOLATILE MEMORY FOR ENCRYPTION AND DECRYPTION OF DISK DATA

630

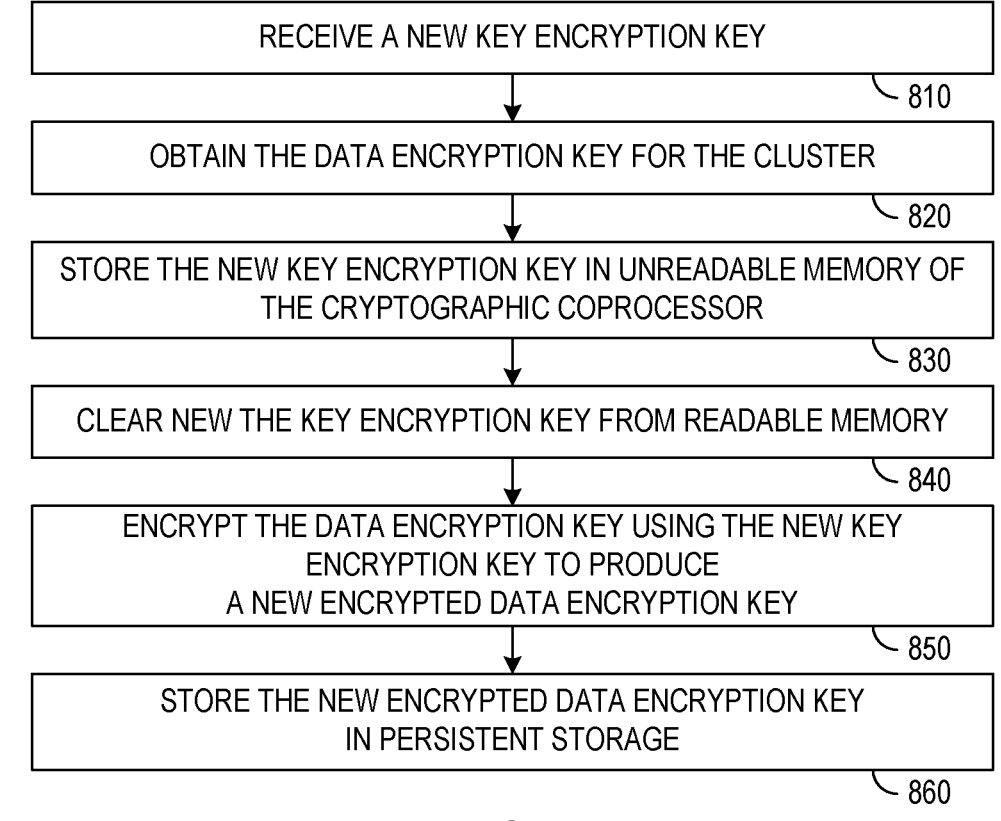

800

RECEIVE A NEW KEY ENCRYPTION KEY

810

OBTAIN THE DATA ENCRYPTION KEY FOR THE CLUSTER

820

STORE THE NEW KEY ENCRYPTION KEY IN UNREADABLE MEMORY OF THE CRYPTOGRAPHIC COPROCESSOR

830

CLEAR NEW THE KEY ENCRYPTION KEY FROM READABLE MEMORY

840

ENCRYPT THE DATA ENCRYPTION KEY USING THE NEW KEY ENCRYPTION KEY TO PRODUCE A NEW ENCRYPTED DATA ENCRYPTION KEY

850

STORE THE NEW ENCRYPTED DATA ENCRYPTION KEY IN PERSISTENT STORAGE

DISTRIBUTION AND UPDATE OF KEYS

BACKGROUND

Clustered storage generally uses two or more storage servers that may be networked together to create a storage system with improved performance, capacity, or reliability. Clustering can allow efficient distribution and management of server workloads, provide data redundancy, and provide shared user access to data from any server. The capabilities that clustered storage provide, through use of multiple separate servers that may be at different physical locations, can present security challenges. Secure storage systems need to give users faith that only the authorized users can access, modify, or destroy their data. Data encryption is a well-known method for limiting data access to authorized users that have the keys needed to decrypt the data. Providing mechanisms to securely handle data encryption keys in a cluster storage system is essential for users to have faith that their data is secure in the cluster storage system.

BRIEF DESCRIPTION OF THE DRAWINGS

FIG. 8 is a flow diagram of an update process performed by a storage node in accordance with an example of the present disclosure.

The drawings illustrate examples for the purpose of explanation and are not of the invention itself. Use of the same reference symbols in different figures indicates similar or identical items.

DETAILED DESCRIPTION

In accordance with an aspect of the present disclosure, encryption keys are kept secure by avoiding storage of the keys in readable persistent media. Secure processes can generate and distribute encryption keys during initial cluster formation and update and distribute new encryption keys when cluster membership changes without storing the encryption keys in readable persistent storage. Some examples of storage systems and methods in accordance with the present disclosure can provide security by using a coprocessor for storage of an unreadable key encryption key, using the coprocessor for encryption and decryption using the unreadable key, securely distributing an initial value of the key encryption key and the data encryption key during system set up, and securely updating the key encryption key when cluster membership changes.

Figure 1:
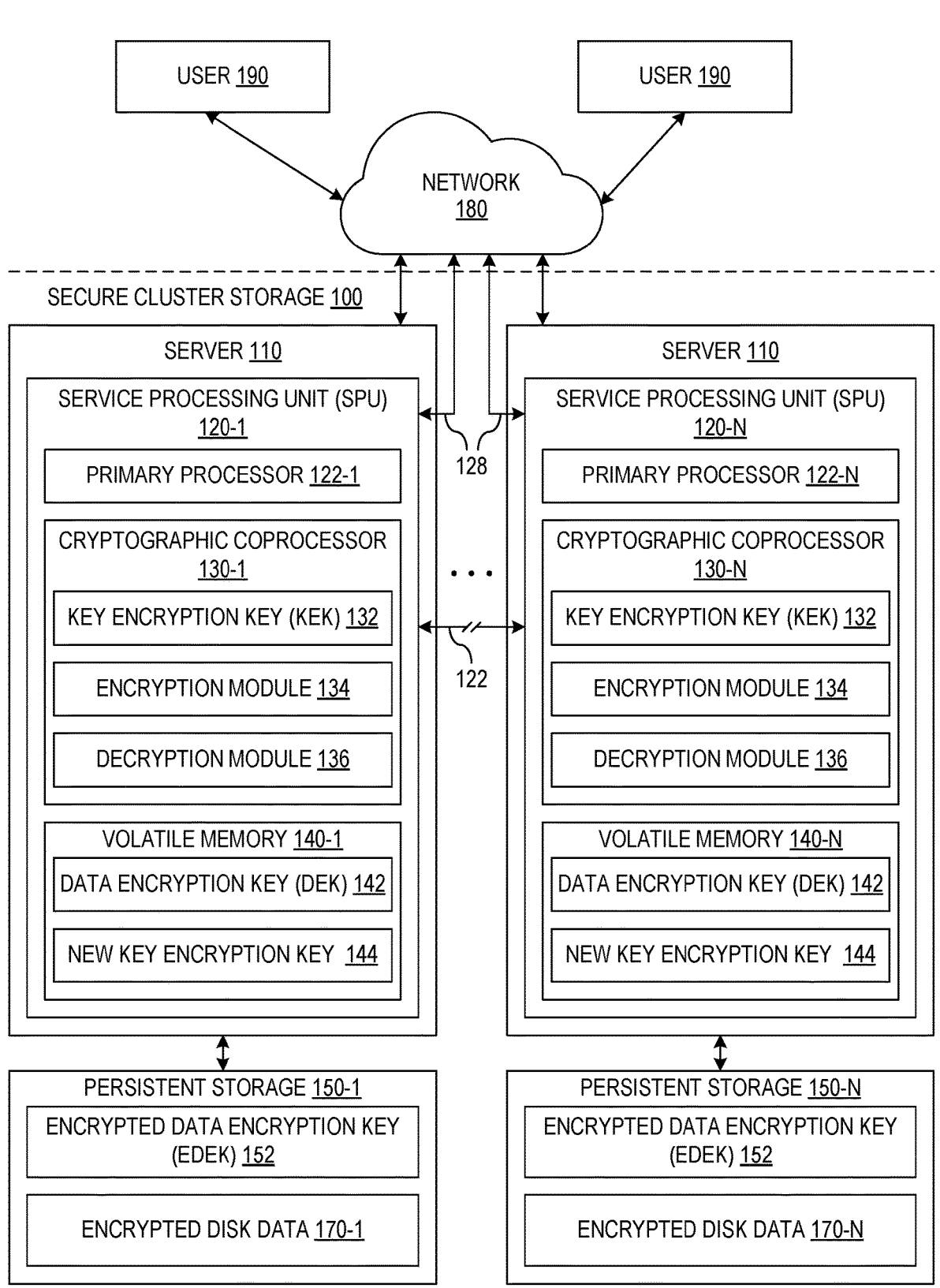
FIG. 1 is a block diagram of a secure cluster storage system in accordance with an example of the present disclosure.

FIG. 1 is a block diagram showing a secure cluster storage system 100 in accordance with an example of the present disclosure. Storage system 100 is a cluster system in that system 100 has multiple storage nodes, i.e., two or more servers 110 with service processing units (SPUs) 120-1 to 120-N and associated persistent storage devices 150-1 to 150-N. The storage nodes or particularly SPUs 120-1 to 120-N, sometimes generically referred to herein as SPU(s) 120, are interconnected using communication interfaces and a dedicated network providing communication links 122 between SPUs 120. SPUs 120 are configured to work together to control persistent storage 150-1 to 150-N, sometimes generically referred to herein as persistent storage 150, and to provide storage services to storage users 190 through a network 180, which may provide communications between users 190 and servers 110. In some implementations, any user 190 may contact an associated server 110 and request that a block of data be written to or read from a user-specified address and volume, and the SPU 120 in the contacted server 110 may implement storage request or communicate the request to another SPU 120 that provides service for the user-specified volume.

SPUs 120 are resident in servers 110, e.g., each SPU 120 may be an add-in card that includes a circuit board assembly with terminals shaped to plug into a slot or socket on an industry-standard bus in a host computer such as a host server 110. For example, each SPU 120 may be a device that is compliant with Industry Standard Architecture (ISA), Extended Industry Standard Architecture (EISA), Micro Channel Architecture (MCA), Peripheral Component Interconnect (PCI), PCI Express (PCI-X), or Small Computer Systems Interface (SCSI) standards for connection to a server 110. In the example of FIG. 1, each of SPUs 120-1 to 120-N in the secure cluster storage 100 is resident in a different server 110. Alternative configurations may have more than one SPU 120 resident in one or more of the servers 110.

Each SPU 120 includes a primary processor 122, a cryptographic coprocessor 130 and volatile memory 140 along with additional hardware and firmware for controlling the associated persistent storage device 150. More specifically, SPUs 120-1 to 120-N contain respective primary processors 122-1 to 122-N, cryptographic coprocessors 130-1 to 130-N and respective volatile memories 140-1 to 140-N that are used to implement storage services. Primary processors 122-1 to 122-N, which are sometimes generically referred to as primary processor(s) 122, are processing systems that may include one or more CPU and memory along with associated hardware interfaces, software, or firmware configured to perform the primary storage functions, e.g., storing and retrieving data for users 190. Each cryptographic coprocessor 130-1 to 130-N may be an integrated circuit chip implementing an encryption module 134 and a decryption module 136 capable of performing encryption and decryption processes using a key stored in internal write-only memory. SPUs 120-1 to 120-N are also connected to and configured to control respective backend storage devices 150-1 to 150-N. Each backend storage device 150 may include a disk array or non-volatile solid-state storage capable storing and retaining data for an extended time with or without power and through power resets.

Figure 2:
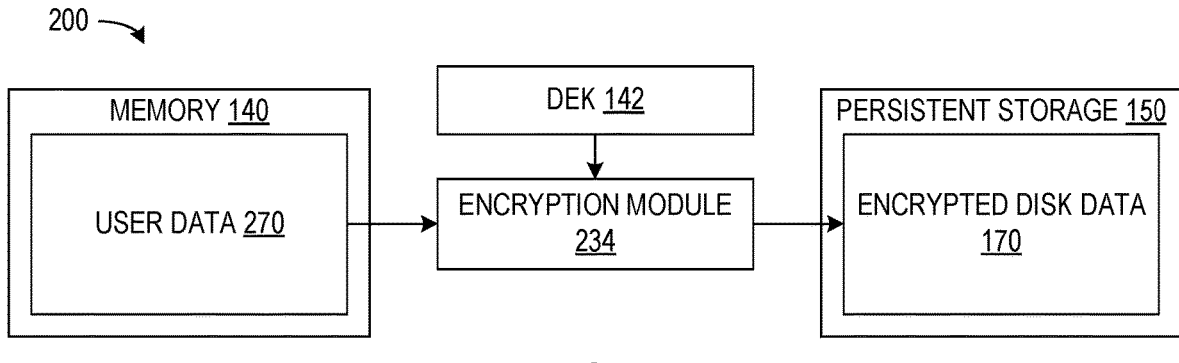
FIG. 2 illustrates a process in accordance with an example of the present disclosure using a data encryption key to encrypt user data and to produce encrypted data for storage in persistent storage.

User data that secure storage system 100 stores in persistent storage 150 is always encrypted. When a user 190 writes user data to a volume provided in storage system 100, the SPU 120 that owns the volume encrypts the write data before encrypted disk data 170 is stored in persistent storage 150 that the SPU 120 controls. An encryption key 142 used when encrypting and decrypting disk data 170 is referred to herein as the data encryption key (DEK) 142, and each of SPUs 120-1 to 120-N may have a copy of the same DEK 142 in its volatile memory 140-1 to 140-N. DEK 142 may be stored in memory in each cryptographic processor 130 or in volatile memory 140 of each SPU 120 depending on whether cryptographic processor 130 or a primary processor 122 of the SPU 120 encrypts or decrypts disk data. In the illustrated example, DEK 142 is only stored in volatile memory 140. Also, instructions executed by the coprocessor 130 or primary processor 122 of an SPU 120 using DEK 142 to encrypt/decrypt data do not store any keys. FIG. 2 illustrates a process 200 in which an encryption module 234 in primary processor 122 or cryptographic coprocessor 130 uses data encryption key 142 to encrypt user data 270 to obtain encrypted disk data 170. For example, during a write operation performed in secure storage system 100, encrypted disk data 170 from encryption module 234 may be stored in the persistent storage 150 controlled by the SPU 120. In general, encryption module 234 can use any encryption techniques.

Figure 3:
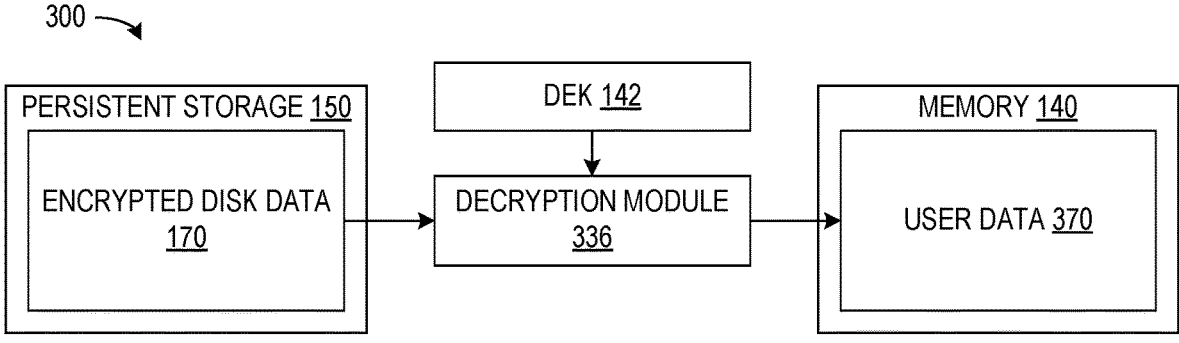
FIG. 3 illustrates a process in accordance with an example of the present disclosure using a data encryption key to decrypt encrypted data from persistent storage.

FIG. 3 illustrates a process 300 in which a decryption module 336 in primary processor 122 or cryptographic processor 130 uses data encryption key 142 to decrypt encrypted disk data 170 from persistent storage 150 to obtain user data 370, for example, to be provided to a user 190 during a read operation performed in secure storage system 100.

DEK 142 is never stored on readable persistent media such as persistent storage 150. As shown in FIG. 1, DEK 142 exists only in volatile memory 140, and memories 140 in system 100 store copies of DEK 142 only while powered on. To preserve DEK 142 (or multiple data encryption keys) across rebooting or power cycling, each cryptographic coprocessor 130 encrypts DEK 142 in a form referred to herein as an encrypted data encryption key (EDEK) 152, and the SPU 120 stores EDEK 152 on the persistent media 150 that the SPU 120 controls. Accordingly, when an SPU 120 powers down or persistent storage 150 is disconnected from its SPU 120, only encrypted data encryption key 152 is available in the persistent storage 150, and DEK 142 is secured from unauthorized accesses to persistent storage 150.

A key 132 that SPU 120 uses to encrypt its DEK 142 and decrypt the EDEK 152 is referred to herein as the key encryption key (KEK) 132. KEK 132 may be randomly generated at cluster formation time. More particularly, a process for configuring secure cluster storage 100 includes generation of KEK 132. KEK 132 is never stored in ordinary persistent media, e.g., never stored in persistent storage 150. KEK 132 is stored in a write-only memory within cryptographic coprocessor 130 in SPU 120 where KEK 132 is unreadable outside of coprocessor 130 but is available for encryption module 134 and decryption module 136 that are implemented inside coprocessor 130. KEK 132 being "unreadable" as use here means that a device external to cryptographic coprocessor 130 cannot access KEK 132 or cause cryptographic coprocessor 132 to output KEK 132.

For example, cryptographic coprocessor 130 may be implemented as an integrated circuit chip with circuitry such that no programming or signals applied to the terminals of the chip can cause output of KEK 132 from the chip.

The example implementation of secure cluster storage system 100 shown in FIG. 1 includes a cluster including two or more SPUs 120 with attached backend storage devices as persistent storage 150. In system 100, DEK 142 is a cluster-wide data encryption key that all SPUs 120 of cluster 100 use to encrypt disk data. Key encryption key 132 is also a cluster-wide key all SPUs 120 of cluster 100 use during encryption of DEK 142, therefore EDEK 152 is the same for all SPUs 120. A setup process for secure cluster storage system 100 can securely distribute KEK 132 and DEK 142 to all SPUs 120-1 to 120-N in the cluster.

Figure 4:
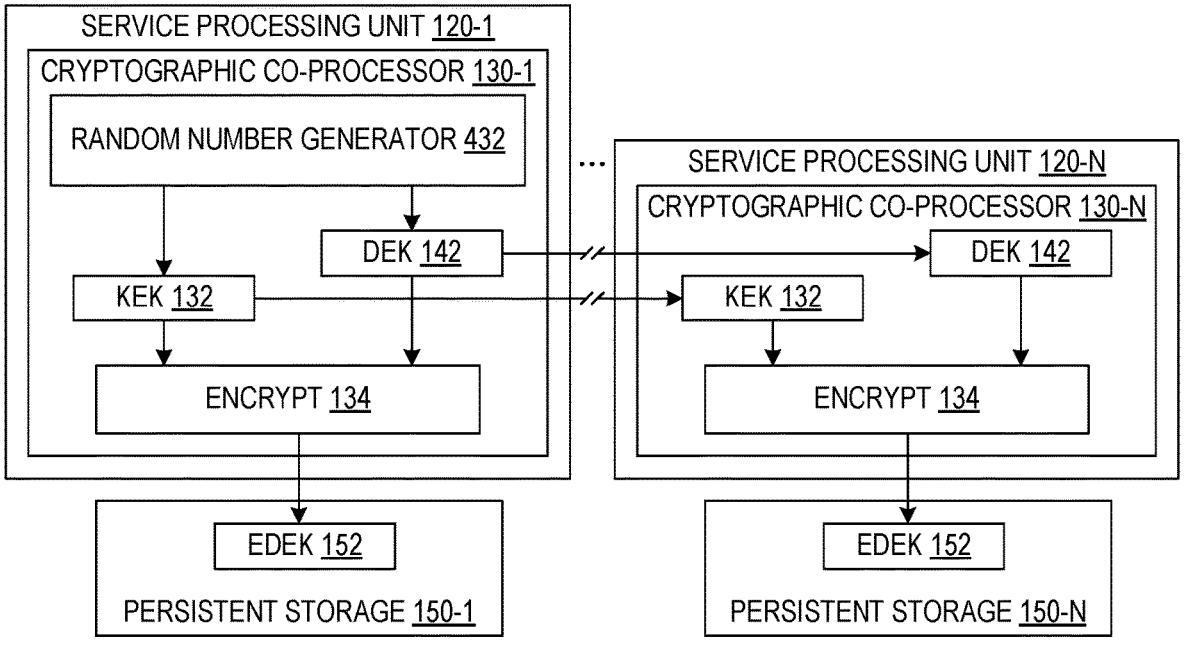
FIG. 4 illustrates an initial cluster configuration process that generates and distributes a key encryption key and a data encryption key to storage nodes in a cluster storage system in accordance with an example of the present disclosure.

FIG. 4 illustrates a setup process in which a key encryption key and a data encryption key may be distributed in a secure cluster storage system. In the example of FIG. 1, one of the SPUs 120 in a cluster, i.e., SPU 120-1 in cluster 100, uses a random number generator 432, which may be implemented SPU 120-1 or its coprocessor 130-1, to generate initial or new values of KEK 132 and DEK 142. Coprocessor 130-1 can then store KEK 132 in unreadable memory and volatile memory 140 and use KEK 132 in an encryption process 424 to encrypt DEK 142 and produce EDEK 152, which SPU 120-1 writes to its persistent storage 150-1. SPU 120-1 also securely transmits KEK 132 and DEK 142 or EDEK 152 from its volatile memory 140 to the other SPUs 120 in the cluster. For example, SPU 120-1 may transmit DEK 142 and KEK 132 to the other SPUs 120-N through the dedicated communication interface 122 that interconnects SPUs 120-1 to 120-N. For added security, the transmission may employ Transport Layer Security (TLS), which is a well-known cryptographic protocol designed using certificates to provide communications security over a computer network. Each SPU 120 stores KEK 132 in unreadable, write-only memory of its encryption coprocessor 130 and clears KEK 132 from any readable memory, e.g., from volatile memory 140. (KEK 132 is not stored in persistent storage 150.) If SPU 120-1 sent DEK 142 to the other nodes, each coprocessor 130 in the other SPUs 120 may use KEK 132 and encryption module 134 to encrypt DEK 142 producing EDEK 152, which each SPU 120 in the cluster 100 may store in its persistent storage 150. Alternatively, if SPU 120-1 sent EDEK 152 to the other nodes, each coprocessor 130 in the other SPUs 120 may store EDEK 152 in its persistent storage 150 and may use KEK 132 and decryption module 136 to decrypt EDEK 152 and produce DEK 142 when the SPU 120 needs to provide storage services.

Figure 5:
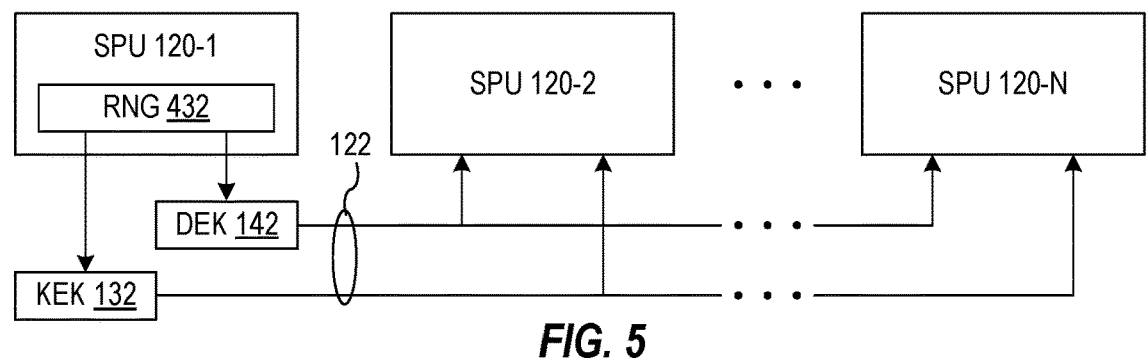
FIG. 5 illustrates transmission of a key encryption key and a data encryption key through secure communications with storage nodes in a cluster storage system in accordance with an example of the present disclosure.

FIG. 5 illustrates how the SPU 120-1 that generated initial values of KEK 132 and DEK 142 using random number generator 432 can distribute KEK 132 and DEK 142 to other SPUs 120 in the cluster 100, i.e., to SPU 120-2 to SPU 120-N, through a dedicated storage network interfaces 122 that interconnect SPUs 120-1 to SPU 120-N.

Figure 6:
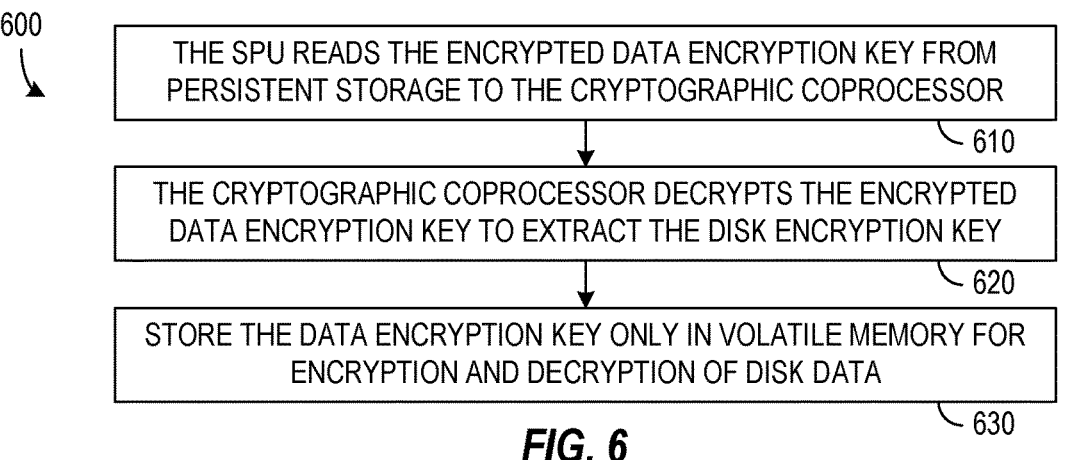
FIG. 6 is a flow diagram of a startup process for a storage node in accordance with an example of the present disclosure.

An SPU that powers up after initialization of a cluster will need the data encryption key to perform storage operations that read or write encrypted data to persistent storage. FIG. 6 is a flow diagram of a process 600 that a service processing unit in accordance with an example of the present disclosure performs when powering up or restarting. When the restarting, the SPU 120 needs DEK 142 before reading from or writing to persistent storage 150, and the SPU 120 in a subprocess 610 reads EDEK 152 from its persistent storage 150 and provides EDEK 152 to the cryptographic coprocessor 130 in the SPU 120. The coprocessor 130 of the restarting SPU 120 can then decrypt EDEK 152 with KEK 132 producing the DEK 142, which may be stored in volatile memory 140 for future use and discarded when the SPU 120 powers down. An advantage of storing DEK 142 in volatile memory 140 is that DEK 142 may be available to primary processor 122, which may be a more powerful than coprocessor 130 and may be able to more quickly encrypt and decrypt the volume of data that is being stored in or read from persistent storage 150.

The membership of a cluster may be changed by adding or removing one or more SPUs or by replacing one or more SPUs in the cluster. When the membership of a cluster changes, the new members need to be configured with a key encryption key and a data encryption key that the cluster will share. The cluster with its new membership could reinitialize, e.g., using the process illustrated in FIG. 4, but if the data encryption key changes, all user data stored in persistent storage will need to be decrypted using the old DEK and encrypted using the new DEK. Otherwise, all encrypted data stored in persistent storage may become unusable. A change in the membership of the cluster may be accompanied by securely distributing a new key encryption key to all nodes in the cluster, and securely providing to the new members the data encryption key, which remains unchanged from before the membership change, or an encrypted data encryption key resulting from re-encrypting the data encryption key using the new KEK.

Figure 7:
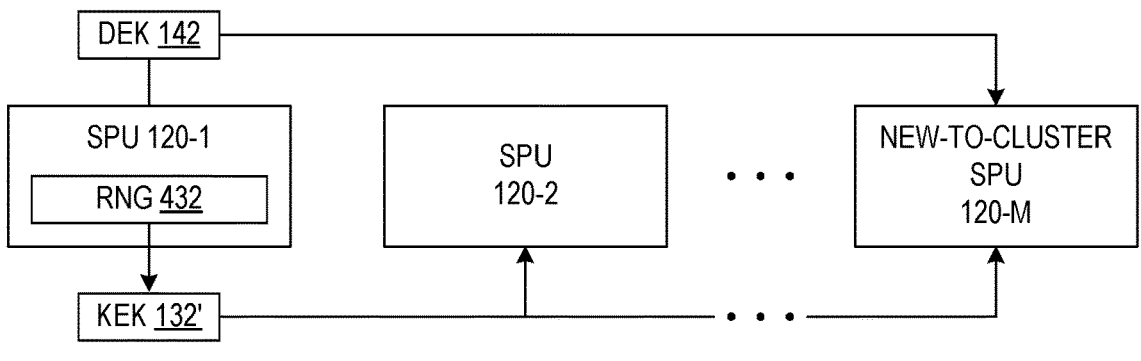
FIG. 7 illustrates transmission of a new key encryption key during an update process for cluster storage in accordance with an example of the present disclosure.

FIG. 7 illustrates a process for changing the key encryption key for a cluster, e.g., after a membership change in the cluster. In the process of FIG. 7, which is described here based on the example secure cluster storage 100 of FIG. 1 after a new SPU 120-M is added. SPU 120-M may be added, for example, with a new associated persistent storage device 150 to expand the storage capacity of secure cluster storage 100, or the added SPU 120-M may replace one of SPUs 120 in the prior membership of cluster 100 in which case SPU 120-M may control persistent storage 150 containing previously encrypted data 170. In the illustrated process, one of the SPUs 120, e.g., the SPU 120-1 that has the lowest ID number, uses a random number generator 432 to generate a new KEK 132' and then securely sends the new KEK 132' to the entire new membership of cluster 100. Since SPU 120-M that wasn't part of the prior cluster 100, SPU 120-M also needs DEK 142. The lowest number SPU 120-1 can read EDEK 152 from its persistent storage 150-1, decrypt EDEK 152 using the old KEK 132, re-encrypt the DEK using the new KEK 132', and send the new KEK 132' and new EDEK to the new SPUs, e.g., SPU 120-M, or to all other SPUs 120, e.g., SPUs 120-2 to SPU 120-M. The new KEK 132' is thus distributed to all other SPUs 120 where the SPUs 120 may re-encrypt the DEK 142 and store the new EDEK 152. The result is that all SPUs 120 have the same KEK and EDEK after membership changes.

FIG. 8 is a flow diagram of a process 800 in which an updating SPU 120 receives a new KEK 132' from the ranking SPU 120-1 during a subprocess 810. The updating SPU 120 in a subprocess 820 then obtains the DEK 142 for the cluster. For example, an SPU 120 that was a member of the cluster before the update may read EDEK 152 from its persistent storage 150 and decrypt EDEK 152 using the old KEK 132 to obtain DEK 142. Alternatively, or if the updating SPU 120 does not have the old KEK 132, the updating SPU 120 obtains DEK 132 from the ranking SPU 120-1. The updating SPU 120 in a subprocess 830 stores the new KEK 132' in unreadable memory of its cryptographic coprocessor 130, e.g., KEK 132' replaces KEK 132 in write-only memory of its coprocessor 130. Once KEK 132' is stored in unreadable memory, the updating SPU 120 in subprocess 840 clears the new KEK 132 from readable memory. The coprocessor 130 of the updating SPU 120 in a subprocess 850 uses new KEK 132' to encrypt the previously obtained DEK 142 and thereby produces the new EDEK 152. The updating SPU 120 in a subprocess 860 stores the new EDEK in its persistent media 150. Since the KEK update process 800 does not change DEK 142, cluster storage system 100 will still be able to access all encrypted data 170 after update process 800.

Each of the modules disclosed herein may include, for example, hardware devices including electronic circuitry for implementing the functionality described herein. In addition, or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A secure storage system, comprising:
   persistent storage storing encrypted data that was encrypted using a first key and storing an encrypted key; and
   a processing unit controlling writes and reads to the persistent storage, the processing unit comprising:
   a volatile memory to store the first key; and
   a cryptographic coprocessor, wherein the cryptographic coprocessor comprises:
   an unreadable memory separate from the persistent storage and accessible by the cryptographic coprocessor in the processing unit and storing a second key; and
   a decryption module configured to perform a decrypt operation using the second key, wherein performing the decryption operation using the second key on the encrypted key produces the first key.

2. The storage system of claim 1, wherein the cryptographic coprocessor further comprises an encryption module configured to perform an encryption operation using the second key, performing the encryption operation using the second key on the first key producing the encrypted key.

3. The storage system of claim 1, wherein the processing unit is configured to perform a write operation comprising:
   using the cryptographic coprocessor to decrypt the encrypted key and produce the first key;
   using the first key in encrypting data from a storage client to produce the encrypted data; and
   operating the persistent storage to write the encrypted data in the persistent storage.

4. The storage system of claim 1, wherein the processing unit is configured to store the first key only in the volatile memory being separate from the unreadable memory and the persistent storage.

5. A cluster storage system comprising a plurality of storage nodes, each of the storage nodes being a secure storage system as recited in claim 1.

6. The cluster storage system of claim 5, wherein each of the storage nodes further comprises a communication interface providing secure communication with a remainder of the storage nodes.

7. A process for operating a cluster storage system, the process comprising:

storing in persistent storage devices of a plurality of storage nodes of the cluster storage system encrypted data that was encrypted using a first key;

storing an encrypted key in each of the persistent storage devices, the encrypted key resulting from encryption of the first key through an encryption process using a second key;

storing a second key in unreadable memory in each of a plurality of processing units that control the persistent storage devices, each unreadable memory being separate from the persistent storage devices and accessible by a cryptographic coprocessor in the processing unit that contains the unreadable memory and being inaccessible outside of the cryptographic coprocessor;

operating the cryptographic coprocessors to use the second key to decrypt the encrypted key, producing the first key;

storing the first key in volatile memory of each of the processing units; and operating each of the processing units to read encrypted data from the persistent storage device the processing unit controls and to perform a cryptographic operation using the first key to provide data to a storage user.

8. The process of claim 7, further comprising:

a selected one of the processing units generating a first random number and a second random number, the first random number being the first key and the second random number being the second key;

the selected processing unit transmitting the first random number and the second random number to a remainder of the processing units;

each of the processing units storing the second random number in the unreadable memory of the cryptographic coprocessor of the processing unit;

clearing the second random number from any readable memory in the cluster storage system;

operating the cryptographic coprocessors to use the second key in encrypting the first key and thereby producing the encrypted key; and storing the encrypted key in the persistent storage devices.

9. The process of claim 7, wherein the coprocessor further comprises an encryption module configured to perform an encryption operation using the second key, wherein performing the encryption operation using the second key on the first key produces the encrypted key.

10. The process of claim 7, further comprising performing a write operation comprising:

using the coprocessor to decrypt the encrypted key and produce the first key;

using the first key in encrypting data from a storage client to produce the encrypted data; and operating the persistent storage to write the encrypted data in the persistent storage.

11. The process of claim 7, wherein the processing unit is configured to store the first key only in the volatile memory being separate from the unreadable memory and the persistent storage.

12. The process of claim 7, wherein the cryptographic coprocessor is an integrated circuit chip in the processing unit.

13. The process of claim 12, wherein no programming or signals applied to one or more terminals of the integrated circuit chip can cause output of the second key from the integrated circuit chip.

14. The process of claim 7, wherein a new second key is generated responsive to an addition of a new processing unit.

15. A processing unit comprising one or more logical units to read encrypted data from a persistent storage device separate from the processing unit by decrypting encrypted data with a first key, the first key being decrypted from an encrypted key with a second key, the encrypted key resulting from an encryption of the first key through an encryption process using a second key, the first key being stored in a volatile memory, and the second key being stored in an unreadable memory accessible only by a cryptographic coprocessor on the processing unit.

16. The processing unit of claim 15, wherein the processing unit further comprises an encryption module configured to perform an encryption operation using the second key, performing the encryption operation using the second key on the first key producing the encrypted key.

17. The processing unit of claim 15, further to perform a write operation comprising:

using the first key in encrypting data from a storage client to produce the encrypted data; and operating the persistent storage to write the encrypted data in the persistent storage device.

18. The processing unit of claim 15, further to store the first key only in volatile memory in the processing unit.

19. The processing unit of claim 15, further comprising an integrated circuit chip.

20. The processing unit of claim 19, wherein no programming or signals applied to one or more terminals of the integrated circuit chip can cause output of the second key from the integrated circuit chip.

* * * * *